United States Patent
Sakata et al.

(10) Patent No.: US 9,789,769 B2
(45) Date of Patent: Oct. 17, 2017

(54) POWER SUPPLY DEVICE FOR VEHICLES

(71) Applicant: SANYO Electric Co., Ltd., Osaka (JP)

(72) Inventors: Hideki Sakata, Hyogo (JP); Nobuyuki Ohsumi, Hyogo (JP); Kaoru Nakajima, Hyogo (JP); Akinobu Tsunesada, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 277 days.

(21) Appl. No.: 14/435,436

(22) PCT Filed: Oct. 24, 2013

(86) PCT No.: PCT/JP2013/006295
§ 371 (c)(1),
(2) Date: Apr. 13, 2015

(87) PCT Pub. No.: WO2014/068918
PCT Pub. Date: May 8, 2014

(65) Prior Publication Data
US 2015/0291039 A1    Oct. 15, 2015

(30) Foreign Application Priority Data
Oct. 29, 2012 (JP) ................................. 2012-238301

(51) Int. Cl.
*H02G 3/00* (2006.01)
*B60L 11/02* (2006.01)
(Continued)

(52) U.S. Cl.
CPC ........... *B60L 11/02* (2013.01); *H01M 10/441* (2013.01); *H01M 10/482* (2013.01);
(Continued)

(58) Field of Classification Search
CPC ............. Y02T 10/7005; Y02T 10/7077; Y02T 10/7016
See application file for complete search history.

(56) References Cited

U.S. PATENT DOCUMENTS

| 7,765,043 B2 * | 7/2010 | Kobayashi | .......... B05B 11/0016 180/65.1 |
| 2010/0222952 A1 * | 9/2010 | Yamaguchi | ............ B60K 6/365 701/22 |

(Continued)

FOREIGN PATENT DOCUMENTS

| JP | 2011-176958 | 9/2011 |
| JP | 2012-100438 | 5/2012 |

OTHER PUBLICATIONS

International Search Report of PCT application No. PCT/JP2013/006295 dated Nov. 26, 2013.

*Primary Examiner* — Sibin Chen
(74) *Attorney, Agent, or Firm* — Wenderoth, Lind & Ponack, L.L.P.

(57) ABSTRACT

A first power storage portion is configured to store power generated by a generator in a vehicle, and to supply power to a motor for starting an engine and an electric device in the vehicle. A second power storage portion is connected to the first power storage portion in parallel, and configured to store power generated by the generator, and to supply power to the electric device in the vehicle. A first switch is inserted in a path between those portions. A diode is connected in parallel with the first switch such that a cathode side thereof is connected to the second power storage portion side. The controlling portion monitors a voltage of the first power storage portion and a voltage of the second power storage portion, and detects an abnormal state of the switch by comparing a voltage difference therebetween with a forward voltage drop of the diode.

1 Claim, 5 Drawing Sheets

(51) Int. Cl.
*H01M 10/44* (2006.01)
*H01M 10/48* (2006.01)
*H02J 7/00* (2006.01)
*H01M 10/06* (2006.01)
*H01M 10/34* (2006.01)

(52) U.S. Cl.
CPC ........... *H02J 7/0024* (2013.01); *H01M 10/06* (2013.01); *H01M 10/345* (2013.01); *H01M 2220/20* (2013.01); *Y02E 60/124* (2013.01); *Y02E 60/126* (2013.01); *Y02T 10/7055* (2013.01)

(56) References Cited

U.S. PATENT DOCUMENTS

2011/0196632 A1* 8/2011 Shimizu ............. G01R 31/3658
702/63
2011/0227540 A1* 9/2011 Kanoh ................... H02J 7/345
320/135

* cited by examiner

POWER SUPPLY DEVICE FOR VEHICLES

TECHNICAL FIELD

The present invention is related to a vehicle power supply device installed in the vehicle.

BACKGROUND ART

At present, a lead-acid battery is installed in many vehicles. This lead-acid battery supplies power to a starter motor, or many kinds of electric devices. The lead-acid battery is inexpensive, but has the characteristics of a short cycle life, compared with a nickel hydride storage battery or a lithium ion storage battery. In the vehicles having the idle stop function (idle reduction function), as the number of charging and discharging is large, especially the life of the lead-acid battery becomes short.

Then, a configuration in which the lead-acid battery, and the nickel hydride storage battery or the lithium ion storage battery are connected in parallel is proposed. In this parallel circuit, it is proposed that a switch between the lead-acid battery and the nickel hydride storage battery or the lithium ion storage battery is provided (for example, refer to patent literature 1). Mainly, this switch is turned off when power is supplied from the lead-acid battery to the starter motor, and is used in order to stabilize a voltage supplied from the nickel hydride storage battery or the lithium ion storage battery to the electric devices. Therefore, in a normal state, this switch is ON in principle.

CITATION LIST

Patent Literature

Patent Literature 1: Japanese Laid-Open Patent Publication No. 2011-176958

SUMMARY OF THE INVENTION

However, in a normal state, it happens that the above switch is turned off by a trouble or the like of wiring for transmitting a controlling signal. It happens that this switch trouble is not detected or confirmed by a controller which outputs its controlling signal.

The present disclosure is developed for the purpose of such needs. One non-limiting and explanatory embodiment provides a technology which appropriately detects a switch trouble which is inserted between power storage portions connected in parallel in a vehicle.

A power source device for a vehicle in the present disclosure comprises a first power storage portion configured to store power generated by a generator in a vehicle, and to supply power to a motor for starting an engine and an electric device in the vehicle, a second power storage portion connected to the first power storage portion in parallel, and configured to store power generated by the generator, and to supply power to the electric device in the vehicle, a switch inserted in a path between the first power storage portion and the second power storage portion, a diode connected in parallel with the switch such that a cathode side thereof is connected to the second power storage portion side, and a controlling portion configured to control the switch. The controlling portion monitors a voltage of the first power storage portion and a voltage of the second power storage portion, and detects an abnormal state of the switch by comparing a voltage difference therebetween with a forward voltage drop of the diode.

A vehicle power supply device of the present disclosure can appropriately detect or find a switch trouble which is inserted between power storage portions connected in parallel in a vehicle.

DESCRIPTION OF EMBODIMENTS

Hereinafter, a vehicle power supply device related to embodiments of the present invention is explained. In the following explanation, the vehicle power supply device is installed in the vehicle having the idle stop function and the regenerative braking function.

In the idle stop function, an engine is automatically stopped at the time of stopping the vehicle, and the engine is automatically restarted at the time of starting the vehicle. In the regenerative braking function, power is generated by the regenerative braking in the inertia rotation of the engine without a fuel. Namely, an alternator operation during the normal driving is restricted, and the load of the engine is decreased. Both functions have an effect to improve a fuel efficiency.

In the vehicle having the idle stop function, the number of starting the engine is increased. Normally, the engine is started by a starter motor driven by a battery voltage. Therefore, as the number of starting the engine is increased, an electric power consumption is increased, and the number of discharging is increased. Further, in the vehicle having the regenerative braking function, as power is intensively generated at deceleration, a battery which has a large capacity and can be efficiently charged, is required.

Figure 1:
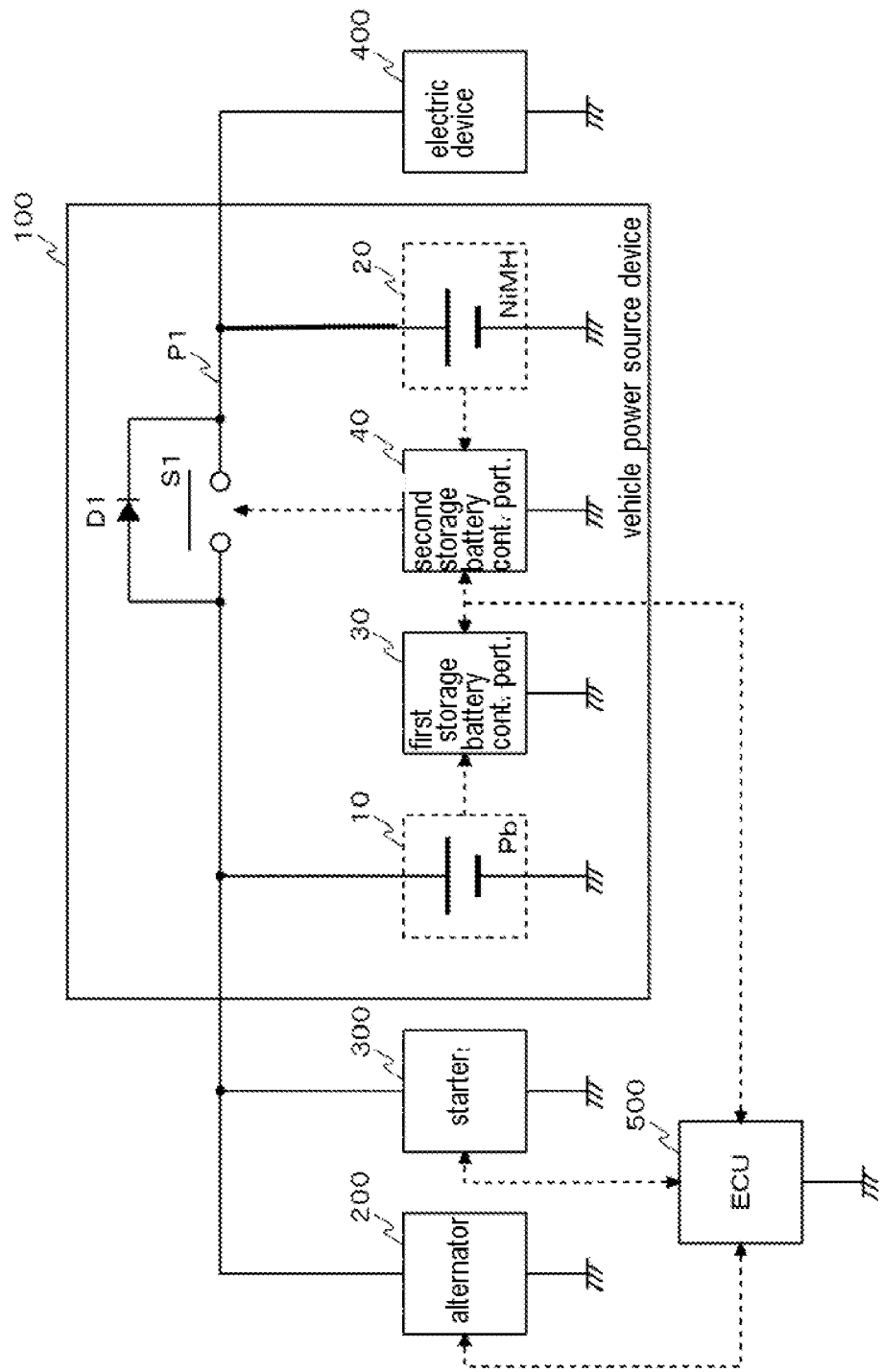
FIG. 1 is a figure showing a vehicle power supply device related to an embodiment of the present invention.

FIG. 1 is a figure showing a vehicle power supply device 100 related to an embodiment of the present invention. The vehicle which incorporates the vehicle power supply device 100, includes an alternator 200, an starter 300, an electric device 400, and an ECU (Electronic Control Unit) 500.

The alternator 200 generates power by a rotation energy of an crank shaft of the engine (not shown in the figures). In this embodiment, power is generated during deceleration. The alternator 200 supplies generated power to the vehicle power supply device 100.

The starter 300 is a motor for starting the engine. The starter 300 is rotated by power from the vehicle power supply device 100, and starts the engine. When an ignition switch (not shown in the figures) is turned on by an operation from a driver, power is supplied from the vehicle power supply device 100 to the starter 300, and the starter 300 starts.

The electric device 400 is a general term indicating many kinds of electric loads, such as, a headlight, a power steering, an oil pump, an car navigation system, an audio or the like. Here, in this specification, for convenience of explanation, the alternator 200, the starter 300, and the ECU are described in a separated state from the electric device 400. The electric device 400 is activated by power supplied from the vehicle power supply device 100.

The ECU 500 is connected to many kinds of auxiliary machinery, sensors, switches which are installed in the vehicle, and carries out electronic controls of the engine and many kinds of the auxiliary machinery. In the case that the idle stop function is carried out, when the ECU 500 detects the vehicle stopping or the deceleration less than a predetermined speed based on signals inputted from a brake, a vehicle speed sensor, or the like, the ECU 500 stops the engine. Then, the ECU 500 restarts the engine by detecting a release of the brake. At that time, the ECU 500 controls such that power is supplied form the vehicle power supply device 100 to the starter 300, and make the starter 300 operate.

In the case that the regenerative braking function is carried out, during the normal driving, the ECU 500 principally stops the alternator 200. When the ECU 500 detects the deceleration based on signals inputted from a brake, a vehicle speed sensor, or the like, and stops the engine. The ECU 500 makes the alternator 200 operate. Here, in the case that a battery capacity is less than a predetermined minimum capacity, the ECU 500 makes the alternator 200 operate even during the normal driving.

The vehicle power supply device 100 includes a first storage battery 10, a second storage battery 20, a first storage battery controlling portion 30, a second storage battery controlling portion 40, and a first switch S1, a diode D1. The first storage battery 10 as a main battery stores power generated by the alternator 200, and supplies power to the starter 300 and the electric device 400. The second storage battery 20 as a sub-battery stores power generated by the alternator 200, and supplies power to the electric device 400. The first storage battery 10 and the second storage battery 20 are connected in parallel.

In this embodiment, the first storage battery 10 is a lead-acid battery, and the second storage battery 20 is a nickel hydride storage battery. The lead-acid battery has merits that it is inexpensive, and is capable of operating in the considerably wide temperature range, and has a high output. Then, the lead-acid battery is widely used as a storage battery for the vehicle. However, the lead-acid battery has demerits that the energy efficiency of charging and discharging is low, and it is weak in over charge or over discharge, and it has a short cycle life. The nickel hydride storage battery has merits that the energy efficiency of charging and discharging is considerably high, and it is strong in over charge or over discharge, and it has a wide temperature range of the usage, a wide SOC (State Of Charge) range, and a considerably long cycle life. However, the nickel hydride storage battery has demerits that the self-discharge is large, it has a memory effect and a low output voltage, and it is more expensive than the lead-acid battery.

In the idle stop function, since the number of the usage of the starter 300 is increased, it is necessary to make the capacity of the storage battery large. The capacity of the lead-acid battery is not increased, but the capacity of the whole storage battery is increased, compensating for demerits of the storage batteries each other by using the combination of plural kinds of the storage batteries having different characteristics.

In this embodiment, as one instance, the combination of the lead-acid battery and the nickel hydride storage battery is explained. It is possible that the lead-acid battery is combined with the lithium ion storage battery. The lithium ion storage battery is high in the energy density and the energy efficiency of charging and discharging, and is the storage battery of a high performance, but it is necessary to carry out the rigid voltage and temperature management.

Generally, the storage battery is disposed in the engine room. The nickel hydride storage battery is more suitable for disposing with the lead-acid battery in the engine room than the lithium ion storage battery. In the engine room, the temperature is increased while the engine works, and the nickel hydride storage battery has an excellent high-temperature resistance than that of the lithium ion storage battery. Here, in the case that the lithium ion storage which connected to the lead-acid battery is disposed at a distant location from the engine room, a loss on wiring resistance is increased.

The first switch S1 is inserted in a path P1 between the charging and discharging terminal of the first storage battery 10 and the charging and discharging terminal of the second storage battery 20. This path P1 is connected to the alternator 200, the starter 300, the electric device 400, and the path P1 is a common current path among the first storage battery 10, the second storage battery 20, the alternator 200, the starter 300, and the electric device 400. As the first switch S1, a relay or a semiconductor switching element (for example, MOSFET (Metal-Oxide-Semiconductor Field-Effect Transistor), IGBT (Insulated Gate Bipolar Transistor)) can be used. In this embodiment, the relay is used.

The first switch S1 is provided for voltage compensation such that the voltage of the above path P1 does not become a predetermined voltage or less at engine cranking and at restarting from a state of the idle stop. Generally, the above path P1 is designed at 12 V. In the electric device 400, once the input voltage of the car navigation system or the like decrease at about 10 V, it is reset. In order to prevent this, the first switch 51 is turned off during operation of the starter 300, and then the electric potential of the charging and discharging terminal of the second storage battery 20 is stabilized, it can supply a stable voltage to the electric device 400.

The diode D1 is connected to the first switch S1 in parallel. The cathode side of the diode D1 is connected to the second storage battery 20 side, and the anode side of the diode D1 is connected to the first storage battery 10 side. In a state that the first switch S1 is the OFF state, an electric current flows through the diode D1 from the alternator 200, the starter 300, and the first storage battery 10 side, to the second storage battery 20 and the electric device 40 side, but no electric current flows in the reverse direction.

The diode D1 functions as a protection diode of the first switch S1. When a large current more than the rated current of the switch S1 flows from the alternator 200 to the above path P1, the diode D1 protects the first switch S1. Further, when the first switch S1 is OFF and the second switch S2 is ON, namely when power is supplied only from the second storage battery 20 to the electric device 400, in the case that trouble in the second storage battery 20 occurs, the diode D1 functions so as to maintain the voltage of the electric device 400. Here, when a MOSFET is used as the first switch S1, the diode D1 can be a body diode of the MOSFET.

The first battery controlling portion 30 manages or controls the first storage battery 10. Concretely, it obtains a voltage, a current, a temperature of the first storage battery 10, and monitors a remaining capacity and the presence or absence of the abnormal state of the first storage battery 10. The first storage battery controlling portion 30 informs the second storage battery controlling portion 40 of the remaining capacity of the first storage battery 10, and informs the ECD 500 of the normal state or the abnormal state of the first storage battery 10. The communication among the first storage battery controlling portion 30, the second storage battery controlling portion 40, and the ECU 500 is carried out, for example, by CAN (Controller Area Network).

The second storage battery controlling portion 40 manages or controls the second storage battery 20. The second storage battery controlling portion 40 is more concretely explained in the following.

Figure 2:
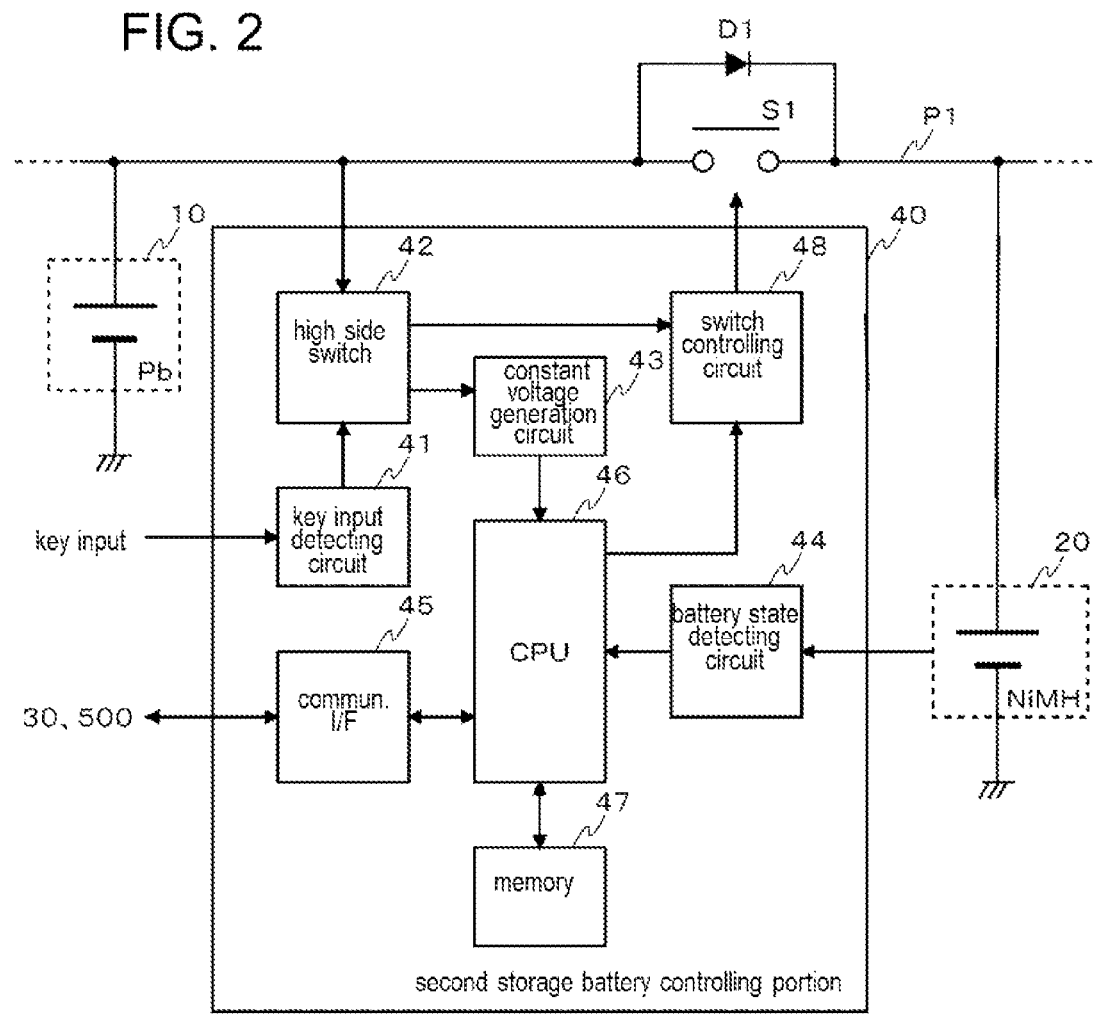
FIG. 2 is a figure explaining a second storage battery controlling portion of FIG. 1.

FIG. 2 is a figure explaining the second storage battery controlling portion 40 of FIG. 1. The second storage battery controlling portion 40 includes a key input detecting circuit 41, a high-side switch 42, a constant voltage generation circuit 43, a battery state detecting circuit 44, a communication interface 45, a CPU 46, a memory 47, and a switch controlling circuit 48.

The key input detecting circuit 41 detects insertion or removal of the ignition key. The key input detecting circuit 41 carries out the ON control of the high-side switch 42 when the driver inserts the ignition key, it carries out the OFF control of the high-side switch 42 when the ignition key is removed. Here, the key input detecting circuit 41 holds the high-side switch 42 OFF when the key position is OFF, and it carries out the ON control of the high-side switch 42 when the key position is ACC, ON, or START.

The high-side switch 42 is provided between the above path P1, and the constant voltage generation circuit 43 and the switch controlling circuit 48. When the high-side switch 42 is turned on, the voltage of the above path P1 is supplied to the constant voltage generation circuit 43 and the switch controlling circuit 48.

The constant voltage generation circuit 43 generates a power source voltage of the CPU 46 and the switching controlling circuit 48. For example, the voltage 12 V of the above path P1 is reduced to the voltage 3 to 5 V. For example, a three-terminal regulator can be used as the constant voltage generation circuit 43.

In this way, by inserting the ignition key, electric power is supplied to the CPU 46, and the second storage battery controlling portion 40 starts.

The battery state detecting circuit 44 obtains a voltage, a current, a temperature of the second storage battery 20. The second storage battery 20 has a shunt resistor (not shown in the figures), and by monitoring both ends voltages of the shunt resistor, a current flowing through the second storage battery 20 can be detected. Further, the second storage battery 20 has a thermistor (not shown in the figures), and the temperature of the second storage battery 20 can be detected. The battery state detecting circuit 44 informs the CPU 46 of the voltage, the current, the temperature of the second storage battery 20.

The communication interface 45 is an interface for the communication among the second storage battery controlling portion 40 and other controlling circuits (the first storage battery controlling portion 30, the ECU 50 in this embodiment). The communication interface 45 transmits the information received from outside to the CPU 46, and transmits the information outputted from the CPU 46 to outside.

In this embodiment, the communication interface 45 receives a state (for example, SOC (State Of Charge) as the remaining capacity of the first storage battery 10) of the first storage battery 10 from the first storage battery controlling portion 30. In addition, the communication interface 45 receives the state information of the vehicle from the ECU 500.

Further, the communication interface 45 transmits the abnormal detection of the second storage battery 20 or the second storage battery controlling portion 40 to the ECU 500. Moreover, it transmits the state information of the second storage battery 20 (for example, a voltage, a current, a temperature) to the ECU 500. Further, it transmits the ON/OFF information of the first switch S1 and the second switch S2 to the ECU 500. In addition, it transmits the request of the power generation by the alternator 200 to the ECU 500.

The CPU 46 controls the whole second storage battery controlling portion 40. Especially, it carries out the ON/OFF control of the first switch S1 and the second switch S2, and the management of the state of the second storage battery 20. The memory 47 stores a controlling program which is carried out by the CPU 46, and data generated by the CPU 46.

The switch controlling circuit 48 turns on or off the first switch S1 and the second switch S2 according to the direction by the CPU 46. In the case that the first switch S1 and the second switch S2 are relays, it controls current passage/current non-passage of the relay coil. In the case of the semiconductor switching element, it controls the gate voltage.

In the case where the first switch S1 is a relay, an open failure happens. In addition, also in the case where the first switch S1 is a semiconductor switching element, it happens that a current does not flow even by applying a rated gate voltage due to an operational failure. Moreover, by a failure of the switching controlling circuit 48 or a disconnection between the switching controlling circuit 48 and the first switch S1, it happens that controlling the first switch S1 by the CPU 46 becomes impossible.

Even though the first switch S1 is unintentionally turned off, as the second storage battery 20 is connected to the above path P1, supplying power to the electric device 400 is maintained. Even though the first switch 1 fails, as troubles of the electric device 400 or the second storage battery 20 do not immediately occur, it is possible that a failure detection of the first switch S1 might be delayed. When its failure is left undone, the second storage battery 20 is apt to be in the over discharge state. Further, an efficiency of power supplied from the alternator 200 or the first storage battery 10 to the electric device 400 is decreased by a forward voltage drop Vf of the diode D1.

Then, in this embodiment, even though the first switch S1 is in the OFF state, as a charging and discharging terminal of the first storage battery 10 and a charging and discharging terminal of the second storage battery are connected to the diode D1, whether or not the first switch S1 is normal can be determined by monitoring a both-end voltage of the diode D1.

Figure 3:
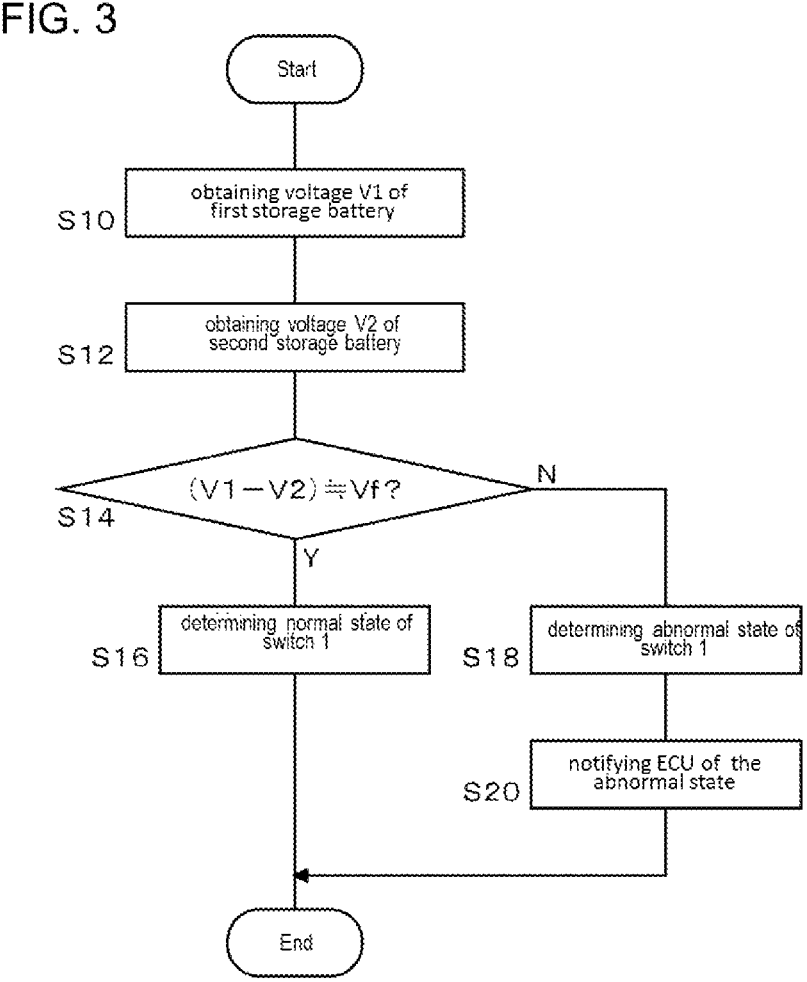
FIG. 3 is a flow chart explaining a trouble determination process of a first switch by a second storage battery controlling portion related to the embodiment.

FIG. 3 is a flow chart explaining a trouble determination process of the first switch S1 by the second storage battery controlling portion 40 related the embodiment. In this trouble determination process, the signal by which the first switch S1 is turned on, is supplied to the first switch S1 from the second storage controlling portion 40.

The second storage battery controlling portion 40 obtains the voltage V1 of the first storage battery 10 from the first storage battery controlling portion 30 (S10), In addition, the second storage battery controlling portion 40 obtains the voltage V2 of the second storage battery 20. The second storage battery controlling portion 40 compares its voltage difference (V1−V2) with the forward voltage drop Vf (S14). As the ON resistance of the switch 1 is negligibly small, its voltage difference (V1−V2) is roughly zero in the ON state of the first switch S1. In contrast, the voltage difference (V1−V2) roughly coincides with the forward voltage drop Vf.

In step S14, when the voltage difference (V1−V2) roughly coincides with the forward voltage drop Vf (Y of S14), the second storage battery controlling portion 40 determines the normal state of the first switch S1 (S16). When the voltage difference (V1−V2) does not roughly coincide with the forward voltage drop Vf (N of S14), the second storage battery controlling portion 40 determines the abnormal state of the first switch S1 or its control system (S18), and notify the ECU of its abnormal state (S20). When the ECU 500 receives this notification, the ECU carries out the control of stopping the alternator 200, the alert notification to a driver or the like.

Fundamentally, the above trouble determination process is carried out at the starting of the second storage battery controlling portion 40. Here, this process may be periodically carried out after the starting of the second storage battery controlling portion 40.

In the above trouble determination process, the voltage of the first storage battery 10 is used as the terminal voltage of the anode side of the diode D1. is connected to the first storage battery 10 side. In this point, when the alternator 200 operates, the fixed output voltage value can be used as the terminal voltage. Further, when a DC/DC converter is connected in the rear stage, the fixed output voltage value can be used as the terminal voltage.

Returned to FIG. 2, the second storage battery 20 in the embodiment comprises plural storage battery cells connected in series. It may be designed that the voltage of the one storage battery cell corresponds to or roughly coincides with the forward voltage drop Vf of the diode D1. For example, the number of the series-connected pieces of the second storage battery 20 is twelve, and the voltage of the one storage battery cell is set at about 1 V, and the forward voltage drop Vf of the diode D1 is also set at about 1 V.

In this case, when the short circuit occurs in the one storage battery cell in the second storage battery 20, the voltage of the second storage battery 20 is decreased from about 12 V to about 11 V, and there is a possibility that the second storage battery 20 is over-charged. When the second storage battery controlling portion 40 detects the short circuit of the one storage battery cell during driving, and notifies the ECU 500 of the failure in the second storage battery 20, and also turns off the first switch S1. By this, the voltage from the alternator 200 or the first storage battery 10 decreased by the forward voltage drop Vf of the diode D1, is supplied to the second storage battery 20 and the electric device 400. Therefore, while the over-charge of the second storage battery 20 is suppressed, it is maintained to supply power to the electric device 400. Then, while the second storage battery 20 and the electric device 400 are protected, the vehicle can move to a repair factory of a car dealer by self-advancing.

According to the embodiment, as explained above, the trouble or failure of the first switch S1 inserted between the first storage battery 10 and the second storage battery 20 connected in parallel, can appropriately be detected by using the forward voltage drop Vf of the diode D1 connected in parallel with the first switch S1. Namely, as the voltage difference between the voltage of the first storage battery 10 of the anode side of the diode D1 and the voltage of the second storage battery 20 side of cathode side of the diode D1, is compared with the forward voltage drop Vf of the diode D1, it is appropriately detected if the first switch S1 is the ON state or if the first switch S2 is the OFF state. Further, as it is carried out by a voltage detecting circuits of the first storage battery 10 and the second storage battery 20, it is not necessary to set a new separated voltage detecting lines. Therefore, the trouble or failure determination of the first switch S1 is carried out without an increase of a cost.

The above explanation is made based on the embodiments of the present invention. The person of the ordinary skill in the art can understand that these embodiments are illustrated, and these constitution elements and these combined processes can be modified, and such modified examples are covered by the scope of the present invention.

Figure 4:
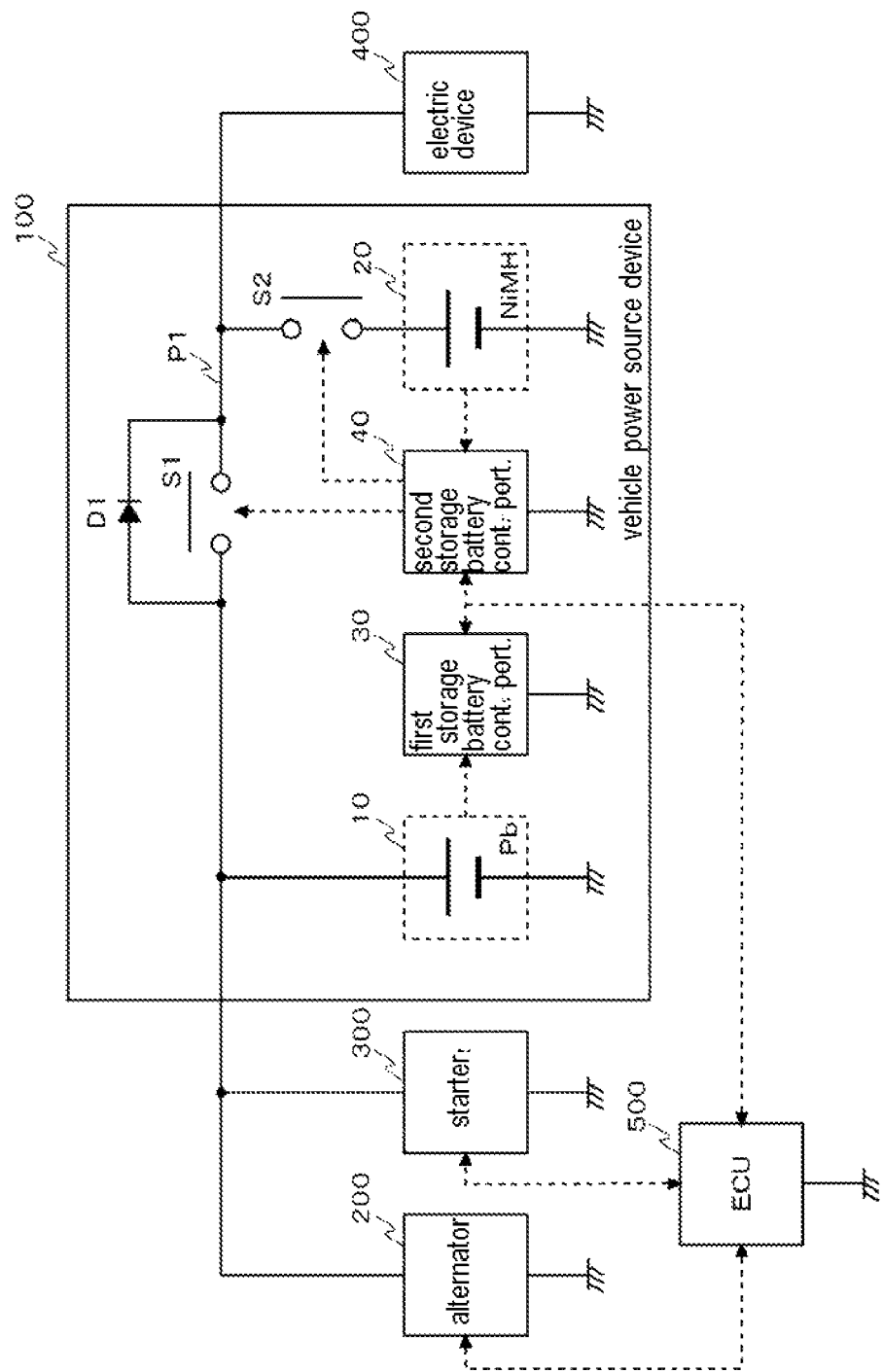
FIG. 4 is a figure showing a vehicle power supply device related to a modified example.

FIG. 4 is a figure showing the vehicle power supply device 100 related to a modified example. In the vehicle power supply device 100 related to the modified example, the second switch S2 is added to the vehicle power supply device 100 of FIG. 1. The second switch S2 is provided between the node among the first switch S1 and the electric device 400 on the above path P1 and the second storage battery 20. Also the second switch S2 is a relay or a semiconductor switching element. In the modified example, the relay is used.

The second switch S2 is provided in order to prevent over charge and over discharge of the second storage battery 20. Further, by turning off the second switch S2 at parking, it functions to prevent a flow of a dark current from the second storage battery 20. The nickel hydride storage battery or the lithium ion storage battery has a lower inner resistance than that of the lead-acid battery, and a current easily flows, and then it easily becomes over charge or over discharge.

The CPU 46 carries out the ON/OFF control of the second switch S2. The switch controlling circuit 48 turns on or off the second switch S2 according to the direction.

Figure 5:
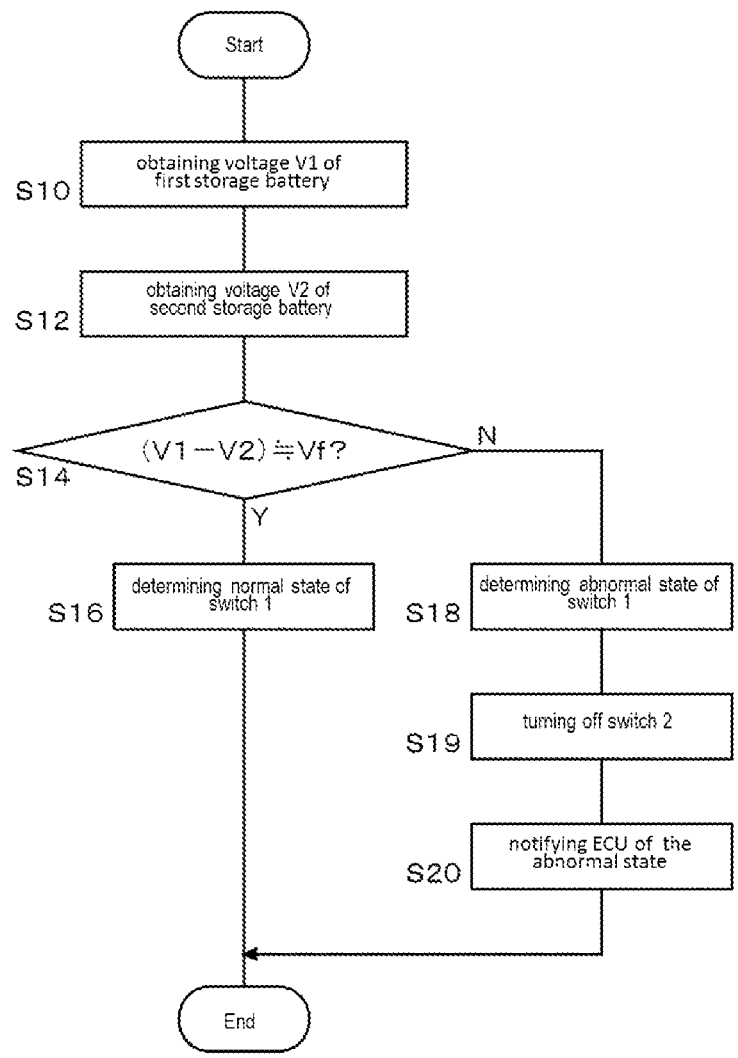
FIG. 5 is a flow chart explaining a trouble determination process of a first switch by a second storage battery controlling portion related to the modified example.

FIG. 5 is a flow chart explaining a trouble determination process of the first switch S1 by the second storage battery controlling portion 40 related to the modified example. In the flow chart of FIG. 5 a process of step S19 is added to the flow chart of FIG. 3. In this trouble determination process, the signal by which the first switch S1 is turned on, is supplied to the first switch S1 from the second storage controlling portion 40, and the second switch S2 is the ON state.

The second storage battery controlling portion 40 determines the abnormal state of the first switch S1 or its control system (S18), and turns off the second switch S2 in the modified example, and notify the ECU of its abnormal state (S20). When the ECU 500 receives this notification, the ECU carries out the control of stopping the alternator 200, the alert notification to a driver or the like. According to the modified example, the over-discharge of the second storage battery 20 is suppressed until the first switch S1 is replaced or repaired.

In the above embodiment, the first storage battery 10 and the second storage battery 20 are respectively managed and controlled by two controlling circuits of the first storage battery controlling portion 30 and the second storage battery controlling portion 40. However, the first storage battery 10 and the second storage battery 20 can be managed and controlled by one controlling circuit.

Further, in the above embodiment, the first storage battery 10 is connected to the nickel hydride storage battery in parallel, but in place of the nickel hydride storage battery, a capacitor (for example, an electric double layer capacitor) can be used.

A fuse can be provided between the above path P1 and the second storage battery 20. In this case, the second storage battery 20 is protected against a large current.

REFERENCE MARKS IN THE DRAWINGS

100: vehicle power source device
200: alternator

300: starter
400: electric device
500: ECU
10: first storage battery
20: second storage battery
30: first storage battery controlling portion
40: second storage battery controlling portion
S1: first switch
S2: second switch
D1: diode D1
41: key input detecting circuit
42: high-side switch
43: constant voltage generation circuit
44: battery state detecting circuit
45: communication interface
46: CPU
47: memory
48: switch controlling circuit

The invention claimed is:
1. A power source device for a vehicle comprising:
a first power storage portion configured to store power generated by a generator in a vehicle, and to supply power to a motor for starting an engine and an electric device in the vehicle;
a second power storage portion connected to the first power storage portion in parallel, and configured to store power generated by the generator, and to supply power to the electric device in the vehicle;
a switch inserted in a path between the first power storage portion and the second power storage portion;
a diode directly connected in parallel with the switch such that (i) an anode side of the diode is directly connected to a first end of the switch on the first power storage portion side of the switch and (ii) a cathode side of the diode is directly connected to a second end of the switch on the second power storage portion side of the switch; and
a controlling portion configured control the switch,
wherein the controlling portion monitors a voltage of the first power storage portion and a voltage of the second power storage portion, and detects an abnormal state of the switch by comparing a voltage difference therebetween with a forward voltage drop of the diode,
wherein the second storage battery comprises plural storage battery cells connected in series, and
wherein a voltage of each of the plural storage battery cells corresponds to the forward voltage drop of the diode.

* * * * *